W. I. SHORT & W. I. COOLEY.
BALANCE VALVE FOR STAND PIPES.
APPLICATION FILED NOV. 13, 1907.
909,697.
Patented Jan. 12, 1909.
2 SHEETS—SHEET 2.
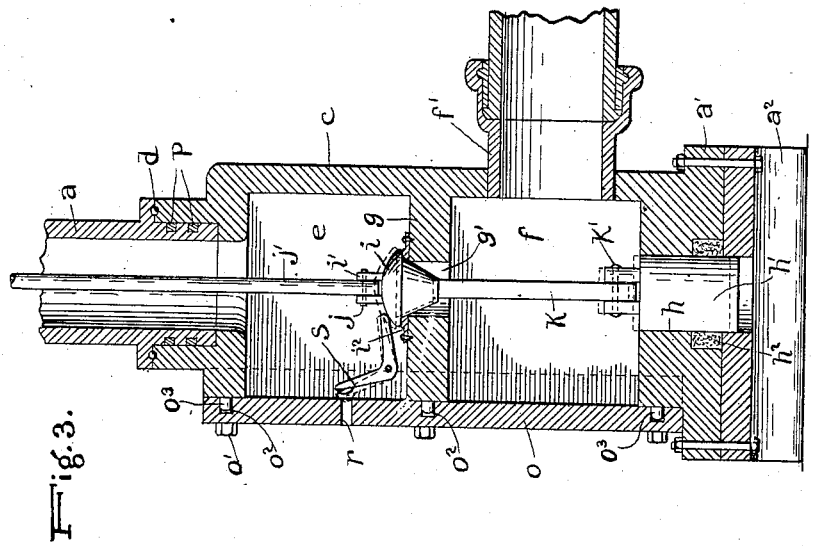
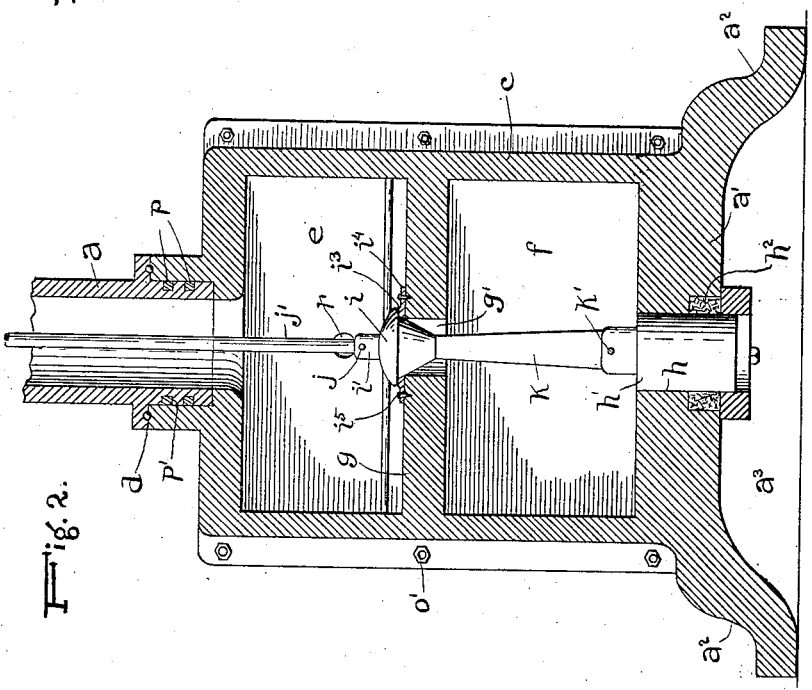
Witnesses
Stuart Hilder.
George M. Anderson.
Inventors
W. I. Short
W. I. Cooley
By E. W. Anderson
Their Attorney

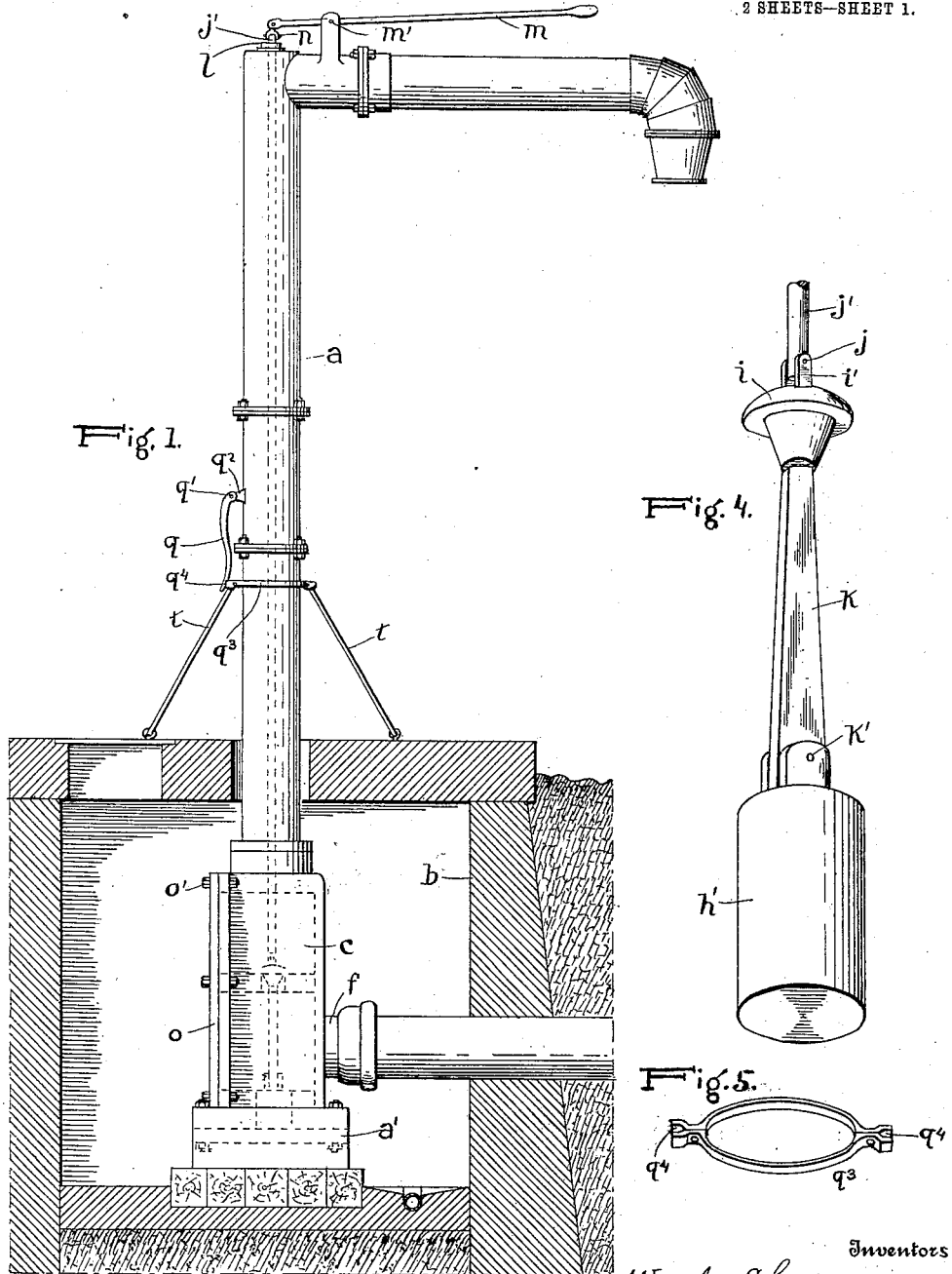

UNITED STATES PATENT OFFICE.

WILLIAM I. SHORT, OF BLUEFIELD, WEST VIRGINIA, AND WILLIAM I. COOLEY, OF GRAHAM, VIRGINIA.

BALANCE-VALVE FOR STAND-PIPES.

No. 909,697.            Specification of Letters Patent.            Patented Jan. 12, 1909.

Application filed November 13, 1907. Serial No. 402,043.

*To all whom it may concern:*

Be it known that we, WILLIAM I. SHORT, a citizen of the United States, resident of Bluefield, in the county of Mercer and State of West Virginia, and WILLIAM I. COOLEY, a citizen of the United States, resident of Graham, in the county of Tazewell and State of Virginia, have made a certain new and useful Invention in Balance-Valves for Stand-Pipes; and we declare the following to be a full, clear, and exact description of the same, such as will enable others skilled in the art to which it appertains to make and use the invention, reference being had to the accompanying drawings, and to letters or figures of reference marked thereon, which form a part of this specification.

The invention relates to balance valves for stand pipes, having for its object the provision of a valve of this character of simple and economical construction, durable in its nature, and not likely to get out of order.

With this object in view, the invention consists in the novel construction and combinations of parts, as hereinafter set forth.

In the accompanying drawings illustrating the invention, the letter $a$ designates a stand pipe for furnishing water to locomotives, water sprinklers, etc.

$b$ is the pit in which the base of such pipe fits, and $c$ is the valve casing located in the pit, and in the upper portion of which the stand pipe rests upon ball bearings, as shown at $d$.

The valve casing is provided with upper and lower chambers $e$ and $f$, divided by a horizontal partition $g$, having an opening $g'$ establishing communication between such chambers, the lower chamber $f$ having a water supply pipe connecting at $f'$. The valve casing has a base portion $a'$, resting upon legs or supports $a^2$, at the sides, the central portion below such base being open, as shown at $a^3$. The bottom of the lower chamber $f$ is provided with a cylindrical seat $h$ running therethrough from top to bottom thereof into the open portion $a^3$ below the base, a cylindrical plug $h'$ fitting neatly in said seat and being slidable therein, such plug having a packing at $h^2$. The opening $g'$ of the partition $g$ is controlled by a valve $i$, located and working in the upper chamber $e$, said valve having at the top a stem $i'$ provided with a detachable connection at $j$ with the vertical operating rod $j'$, and at the bottom a stem extension $k$ having a detachable connection $k'$ with the cylinder plug $h'$. A valve seat $i^2$ is provided for the valve $i$, said seat having a raised or embossed upper surface $i^3$, and a perforated flange $i^4$, securing screws $i^5$ engaging the flange perforations, and rendering the seat detachable for purpose of repair or renewal.

The operating rod $j'$ extends upward through the center of the stand pipe, projecting through the upper end of the upright portion of such pipe, through a stuffing box $l$, as shown, an operating lever $m$ being fulcrumed at $m'$ at the top of the stand pipe and having a swivel connection $n$ with the operating rod. The valve casing is closed at one side by means of a detachable cover plate $o$, having lateral bolt connections $o'$ with flanges of the casing, such plate having central seats or depressions $o^2$ engaging studs $o^3$ of the casing to aid in supporting the plate in position.

The stand pipe is provided at its base below the ball bearings with packing rings $p$ of spring split character said rings being sprung into grooves $p'$ of the pipe and having contact with the inner surface of the collar of the casing in which the pipe fits.

A lever $q$ is provided for turning the stand pipe, said lever having a pivot bolt connection $q'$ with a lug $q^2$ of the pipe $q$ and being arranged to fit at its lower end in a groove of a split collar or band $q^3$, whereby the stand pipe is held from turning. Two grooves $q^4$ are provided in the band $q^3$ for this purpose at diametrically opposite points. An opening is made at $r$ through one side of the valve casing, preferably through the removable cover plate, such opening being controlled by an angle lever valve device $s$, which is arranged to be operated to close the opening as the valve $i$ is raised, and to uncover the opening as the valve $i$ falls, whereby the water in the stand pipe above the valve $i$ is allowed to drain into the pit, whence it is removed by the pit drain.

Guy rods are provided at the base of the stand pipe $t$, said rods having connection with band or collar $q^3$.

The operation of the device is as follows— Upon operation of the lever $m$, the rod $j'$ will be lifted to raise the valve $i$ from its seat, thus admitting water to the stand pipe and supplying the locomotive. When it is desired to shut off the water supply, the lever m is operated reversely, which will cause the valve i to close its seat, whereon it will be securely held owing to water pressure upon the top of the cylinder plug h', there being no water pressure upon the bottom of such plug. The cylinder plug is graded in size to provide sufficient top surface to overcome the force of the upward directed current of water against the valve i, and the friction due to the working of the cylinder plug in its seat, allowance being made for keeping the valve securely closed.

Having thus described our invention, what we claim as new and desire to secure by Letters Patent is:—

1. In a stand pipe, a balance valve including a valve casing having upper and lower chambers provided with an opening establishing communication therebetween, the lower of said chambers having a seat extending through its bottom wall to the atmosphere, a valve controlling said opening, a slidable plug in said seat, said valve having a lower stem extension connected with said plug, a vertical operating rod extending upward through the stand pipe and having at its lower end connection with said valve, and an operating lever having connection with the upper end of said rod.

2. In a stand pipe, a balance valve including a valve casing having a partition dividing the same into upper and lower chambers and provided with an opening establishing communication therebetween, the lower of said chambers having a seat extending through its bottom wall to the atmosphere, a valve controlling said opening, a slidable plug in said seat, said valve having a lower stem extension connected with said plug, said stand pipe communicating with said upper compartment, the vertical arm of the stand pipe overlying said valve and said plug and being in line therewith, a vertical operating rod extending upward through the stand pipe and having at its lower end direct connection with said valve, and operating means for said rod.

3. In a stand pipe, a balance valve including a valve casing having upper and lower chambers provided with an opening establishing communication therebetween, the lower of said chambers having a seat extending through its bottom wall to the atmosphere, a valve controlling said opening, a slidable plug in said seat, said valve having a lower extension connected with said plug, means for operating said valve and slidable plug, including an operating rod provided with connection with said valve, the upper chamber having a drain opening in its side wall above said valve and a bell crank lever having one arm thereof extending over said valve and the other arm thereof extending over said drain opening and adapted to control the same.

In testimony whereof we affix our signatures, in presence of two witnesses.

W. I. SHORT.
W. I. COOLEY.

Witnesses:
B. H. BAILEY,
A. P. DICKENSON.